United States Patent
Pramod et al.

(10) Patent No.: US 10,618,547 B2
(45) Date of Patent: *Apr. 14, 2020

(54) REGENERATIVE CURRENT LIMITING OF DC MACHINES

(71) Applicant: STEERING SOLUTIONS IP HOLDING CORPORATION, Saginaw, MI (US)

(72) Inventors: Prerit Pramod, Saginaw, MI (US); Krishna MPK Namburi, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,396

(22) Filed: Sep. 26, 2017

(65) Prior Publication Data

US 2019/0092381 A1 Mar. 28, 2019

(51) Int. Cl.
*H02P 7/06* (2006.01)
*B62D 5/04* (2006.01)

(52) U.S. Cl.
CPC ........... *B62D 5/0463* (2013.01); *B62D 5/046* (2013.01); *B62D 5/0481* (2013.01); *H02P 7/06* (2013.01)

(58) Field of Classification Search
CPC ........ H02P 3/18; H02P 21/0089; H02P 6/157; H02P 21/22; H02P 2207/05; H02P 23/12; B60L 7/14; Y02T 10/643; Y02T 90/16
See application file for complete search history.

(56) References Cited

U.S. PATENT DOCUMENTS

| | | | |
|---|---|---|---|
| 6,222,334 B1 * | 4/2001 | Tamagawa | B60L 7/10 180/65.21 |
| 7,994,214 B2 * | 8/2011 | Holm | A61K 31/439 514/450 |
| 8,896,244 B2 * | 11/2014 | Kleinau | H02P 3/18 318/139 |
| 2008/0027609 A1 * | 1/2008 | Aoki | B62D 5/0463 701/43 |
| 2013/0154524 A1 * | 6/2013 | Kleinau | H02P 3/18 318/376 |
| 2014/0239860 A1 * | 8/2014 | Kleinau | B62D 5/046 318/400.14 |
| 2016/0297471 A1 * | 10/2016 | Yamanaka | B62D 5/0463 |

* cited by examiner

*Primary Examiner* — Rina I Duda
(74) *Attorney, Agent, or Firm* — Dickinson Wright PLLC

(57) ABSTRACT

Technical solutions are described for a control system that includes a current command module configured to receive a torque command and output a current command for controlling a direct current (DC) motor, and a regenerative current limiting module configured to receive a regenerative current limit as an input and actively compute a motor current limit based on the regenerative current limit, the regenerative current limiting module configured to limit the current command based on the motor current limit.

10 Claims, 9 Drawing Sheets

REGENERATIVE CURRENT LIMITING OF DC MACHINES

BACKGROUND

The present invention relates to methods and systems for controlling or managing DC machines, and more particularly to methods and systems for limiting regenerative current of DC machines, and particularly permanent magnet DC (PMDC) machines.

Electrical power steering (EPS) systems use an electric motor as an actuator to provide assist to a driver while steering a vehicle and/or to provide vehicle control. Brushed DC machines are widely used in the Electric Power Steering (EPS) industry for low-cost applications and platforms. Electric drive systems employing such machines require fewer sensors and low-cost electronic circuitry and are able to deliver good performance through the entire operating space.

In order to protect the voltage source (e.g., a car battery) to the motor control system, a voltage versus supply current limit is typically imposed. In addition, the maximum supply current that can be supplied back to battery, i.e. regenerative current, is also limited. This may be in the form of a table calibrated offline or an online limit that is sent to the motor control system. Given this supply and regenerative current limits, the motor current command must be modified in order to ensure that the system does not draw any more current than specified at the cost of reduced torque capability, so that the voltage source is protected.

SUMMARY

According to one or more embodiments a control system includes a current command module configured to receive a torque command and output a current command for controlling a direct current (DC) motor, and a regenerative current limiting module configured to receive a regenerative current limit as an input and actively compute a motor current limit based on the regenerative current limit, the regenerative current limiting module configured to limit the motor current command based on the regenerative current limit based motor current limits.

According to one or more embodiments a method for controlling a direct current (DC) motor includes receiving a torque command and outputting a current command for controlling the DC motor. The method further includes receiving a regenerative current limit as an input. The method further includes actively computing, by a regenerative current limiting module, a motor current limit based on the regenerative current limit. The method further includes limiting the motor current command based on the motor current limit.

According to one or more embodiments an electrical power steering system includes a direct current (DC) motor, a current command module that receives a torque command and output a current command for controlling the DC motor, and a regenerative current limiting module. The current limiting module receives a regenerative current limit as an input and actively compute a motor current limit based on the regenerative current limit, and further limits the motor current command based on the motor current limit.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
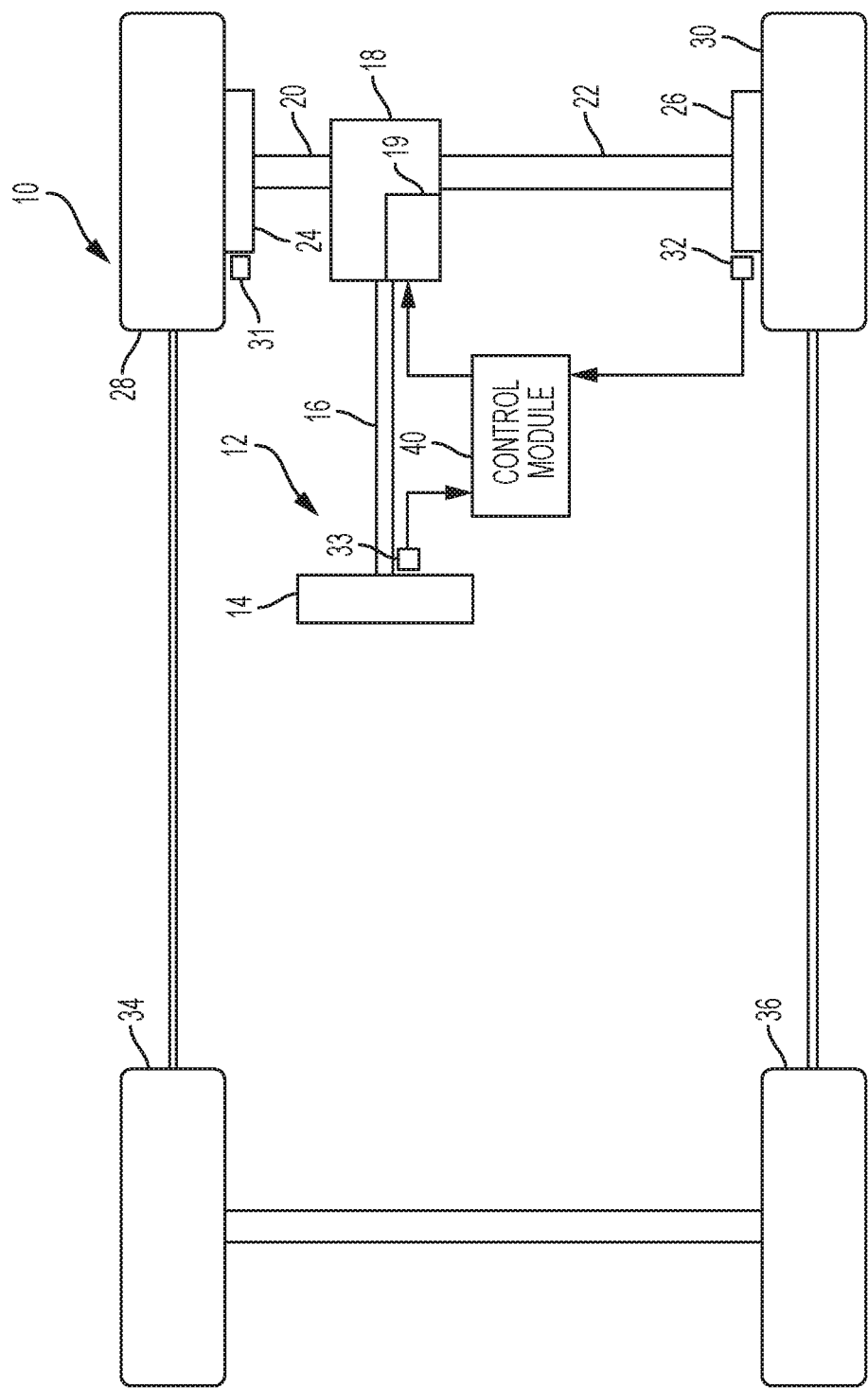
FIG. 1 is a functional block diagram illustrating a vehicle including a steering control and/or assistance system in accordance with an embodiment of the invention.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an embodiment of a vehicle 10 including a steering system 12 such as an electrical power steering (EPS) and/or driver assistance system is illustrated. In various embodiments, the steering system 12 includes a handwheel 14 coupled to a steering shaft 16. In the embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a steering actuator motor 19 (e.g., electrical motor) and a rack and pinion steering mechanism (not shown) that may be coupled through the steering shaft 16 to the steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

The actuator motor 19 is a direct current (DC) electric machine or motor. In one embodiment, the motor 19 is a brushed DC motor. The brushed DC motor includes a stator and a rotor. The stator includes a brush housing having a plurality of circumferentially spaced brushes disposed about a commutator, each brush having a contact face that is in electrical contact with the commutator. Although embodiments described herein are applied to a permanent magnet brushed DC motor, they are not so limited and may be applied to any suitable DC machine.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. The sensors 31, 32 generate wheel speed signals based thereon. In other examples, other wheel speed sensors can be provided in addition to or alternative to the sensors 31 and 32. The other wheel speed sensors may sense a rotational speed of rear wheels 34, 36 and generate sensor signals based thereon. As can be appreciated, other wheel sensors that sense wheel movement, such as wheel position sensors, may be used in place of the wheel speed sensors. In such a case, a wheel velocity and/or vehicle velocity or speed may be calculated based on the wheel sensor signal. In another example, the sensor 33 is a torque sensor that senses a torque placed on the handwheel 14. The sensor 33 generates torque signals based thereon. Other sensors may include sensors for detecting the position (motor position) and rotational speed (motor velocity or motor speed) of the steering actuator motor or other motor associated with the steering assist unit 18.

A control module 40 controls the operation of the steering system 12 based on one or more of the sensor signals and further based on the steering control systems and methods of the present disclosure. The control module may be used as part of an EPS system to provide steering assist torque and/or may be used as a driver assistance system that can control steering of the vehicle (e.g., for parking assist, emergency steering control and/or autonomous or semi-autonomous steering control).

Aspects of embodiments described herein may be performed by any suitable control system and/or processing device, such as the motor assist unit 18 and/or the control module 40. In one embodiment, the control module 40 is or is included as part of an autonomous driving system.

A processing or control device, such as the control module 40, is configured to control a DC motor such as a brushed DC motor (e.g., the motor 19) according to a control method. Aspects of the control method include executing an algorithm for actively limiting the regenerative current draw based on operating conditions of the DC motor and/or other components of a system that includes a DC motor (e.g., an EPS system). For example, in order to protect the voltage source to the motor control system, which in the case of EPS is a car battery, a voltage versus supply current limit is typically imposed. In addition, the maximum of supply current that can be supplied back to battery, i.e. regenerative current, is also limited. These limits may be imposed in the form of a table calibrated offline or determined online, that is dynamically, based on vehicle operating conditions that are sent to the motor control system in the form of one or more control signals. Given the regenerative current limit, the technical solutions described herein modify the motor current command to ensure that the motor control system does not send back any more current to the power source than specified. In one or more examples, such limits are at the cost of reduced torque capability, so that the battery is protected. Further, in case the vehicle, a motor control system facilitating limits on regenerative current enables OEMs to manage vehicle power flow from one or more vehicle subsystems drawing power from the power source. The technical solutions herein thus facilitate a consolidated active power management function that can ensure the regenerative current limiting for brushed DC machines under all operating conditions. The current limit can be a calibration, a continuously changing signal, or a function of other signals (such as battery voltage).

The technical solutions described herein facilitate actively limiting the regenerative current supplied back to the voltage source based on the operating conditions of the motor control system. The regenerative current limit is translated to equivalent motor current limit curves by solving the power equations of the voltage loop. Due to the mathematical complexities arising from the unique challenges of active regenerative current limiting, additional operations are described that ensure stable operation of the limiting algorithm. The independently determined motor current limits for constraining the regenerative currents may be used along with the motor current limits computed for capability, external motor current as well as supply current limiting to be able to simultaneously manage all the power management requirements. Further, the technical solutions facilitate limiting the regenerative current for a simplified brush drop model, which lends itself well to lower implementation throughput requirements.

Thus, in one or more examples, a regenerative current limit is translated to equivalent motor current limit values or curves by solving power equations of a voltage loop defined by a motor control system and the DC motor. Thereafter, the motor current limits are additionally imposed on the system using an algorithm for motor current limiting. The control method provides an added function for active supply current limiting, which determines the motor current limits for ensuring that supply current limits are met. The motor current limits generated by this algorithm may serve as additional limits to other limiting schemes presently used for DC machines.

Figure 2:
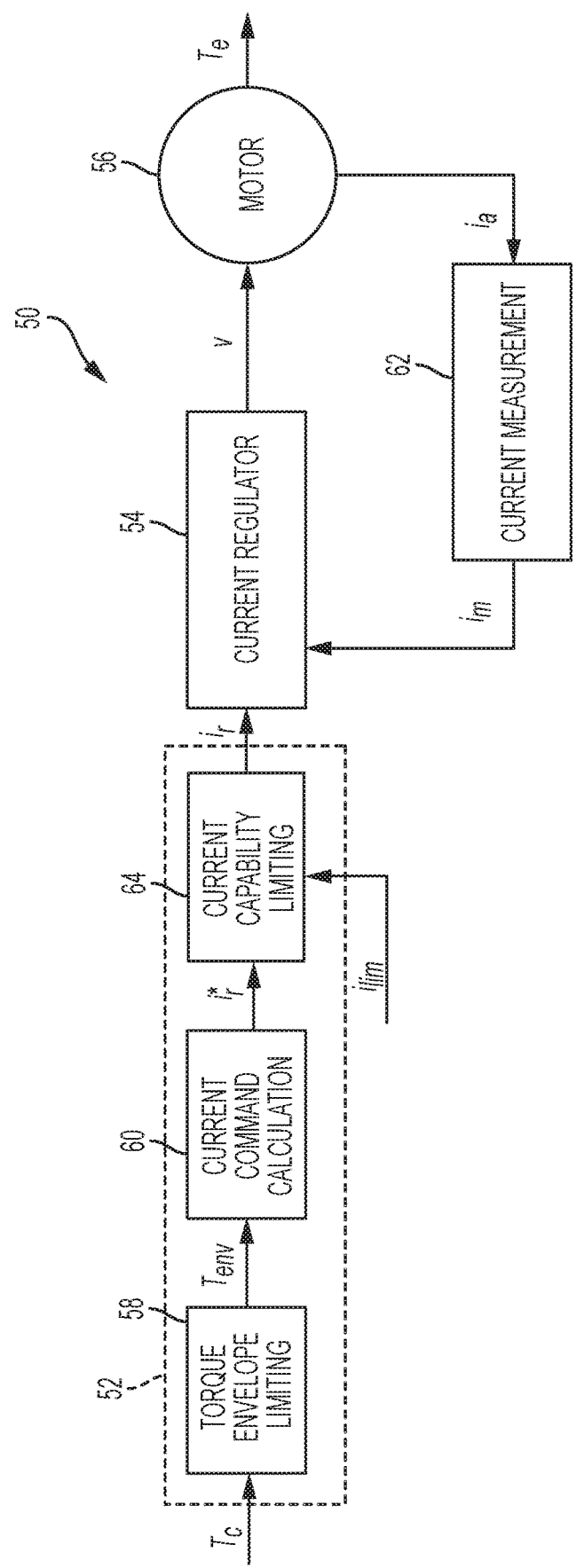
FIG. 2 is a schematic illustrating components, modules and functions of a DC motor control system in accordance with an embodiment of the invention.

Referring now to FIG. 2, a dataflow diagram illustrates an exemplary embodiment of a control device or system 50 for controlling a DC motor, such as a brushed DC motor. The control system 50, in one embodiment, is or includes an EPS control system such as the control module 40 of FIG. 1. In various embodiments, the control device or system (e.g., the module 40) can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. Inputs to the control module 40 can be generated from sensors such as the sensors 31, 32, 33 (FIG. 1) of the vehicle 10 (FIG. 1), can be received from other control modules (not shown) within the vehicle 10 (FIG. 1), can be modeled, and/or can be predefined.

In the example of FIG. 2, the control system 50 includes various modules or sub-modules such as a current command module 52 that receives a torque command ($T_c$) and outputs a current command ($i_r$) to a current regulator 54 used for controlling the currents of a brushed DC motor 56. The current command module 52 includes a torque envelope limiting module 58 that outputs an enveloped torque command ($T_{env}$) to a current command calculation module 60. A current command ($i_r$) is sent from the current command module 52 to the current regulator 54 that applies a voltage to the DC motor 56 based on the current command. For example, the current regulator 54 generates a voltage command (v) using the current command, which can be converted to a pulse width modulation (PWM) signal that is transmitted to the DC motor via a power converter such as an H-bridge. A current measurement module 62 measures the current produced by the DC motor 56, i.e., a motor current ($i_a$), and outputs a measured current value ($i_m$) to the current regulator 54.

In one embodiment, the control system 50 includes a current capability limiter or current capability limiting module 64 that receives an external motor current limit ($i_{lim}$), along with the other signals, and limits the enveloped torque command based on the current limit $i_{lim}$. The current limiting module 64 can be connected to or include functionality that further limits the enveloped torque command to the capability limit of the motor 56.

Figure 3:
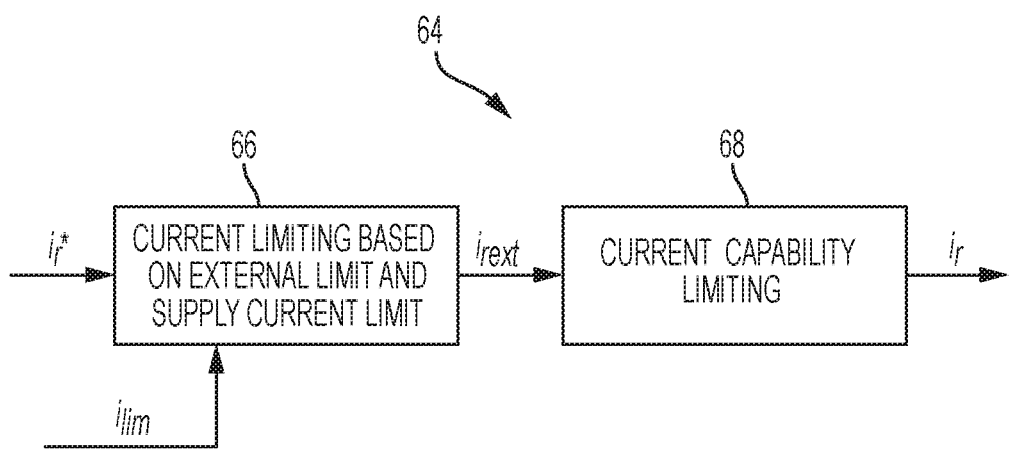
FIG. 3 depicts aspects of a current capability limiting method that can be performed by the motor control system of FIG. 2.

FIG. 3 shows an embodiment of the current capability limiting module 64. In this embodiment, the current capability limiting module 64 receives a current command ($i_r^*$) from the current command calculation module 60 and an externally provided current limit ($i_{lim}$), and first limits the current to a first limited current value ($i_{rext}$) as shown by block 66 (e.g., via a current limiting module that is part of or connected to the current capability limiting module 64). The current command ($i_r^*$) may be first limited to the externally provided limit ($i_{lim}$), which may in some instances be a calibration, based on the following logic:

$$i_{rext} = \begin{cases} \sigma(i_r^*)\min(|i_r^*|, i_{lim}), & |i_r^*| \geq i_{lim} \\ i_r^*, & |i_r^*| < i_{lim} \end{cases}$$

The limited current value ($i_{rext}$) is then compared with capability curves of the DC machine or motor and further limited, as shown by block 68, to ensure that the control system 50 determines optimal current commands based on the operating conditions of the machine. Note that the steady state voltage-current equation is used for capability computation.

Figure 4:
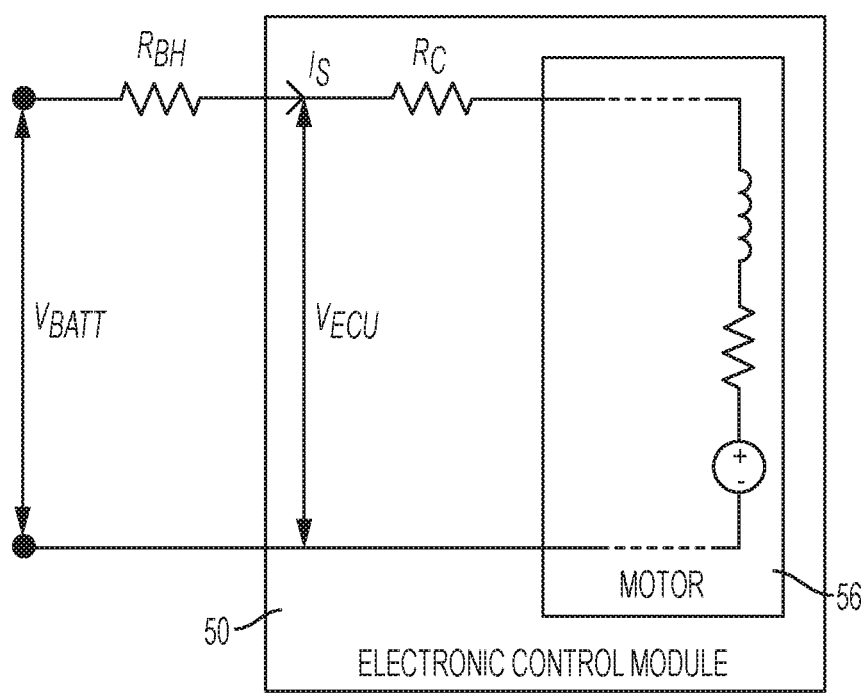
FIG. 4 depicts an example of a power flow diagram of a DC motor control system.

In one embodiment, the current capability module 64 (or other suitable processor) is configured to further limit the current command using motor current limits that are computed based on electrical properties of the control system 50 and the motor 56. When an additional supply current limit is imposed on the system 50, the corresponding motor current limits to ensure that the provided supply current ($I_S$) does not exceed the specified limit can be determined online. The power flow of a motor control system (e.g., the system 50) for a brushed DC motor (e.g., the motor 56) control system is shown in FIG. 4. The system 50 and the motor 56 define a voltage loop that includes the voltage across a battery and the voltage across the motor 56.

For a given battery voltage ($V_{BATT}$), and a measurement of the voltage input ($V_{ECU}$) to the system 50, the power equations may be solved to obtain motor current limits. A supply current $I_S$ is related to the regenerative current $I_B$ as follows.

$$I_b = -I_S$$

Further, the voltage circuit model considering the battery may be mathematically expressed as follows.

$$V_{ECU} = V_{BATT} - R_{BH} I_S$$

where $R_{BH}$ represents the battery harness resistance. The power balance equation of this system may be written as follows.

$$V_{ECU} I_S - R_c I_S^2 = P_e - V_{ECU} I_b - R_c I_b^2 = P_e$$

where $R_c$ is the controller input resistance and $P_e$ is the electrical power input to the motor control system (or drawn by the motor control system). The expression for $P_e$ may be represented as follows:

$$P_e = v_m i_m$$
$$= R_m i_m^2 + K_e \omega_m i_m + v_B i_m,$$

where $v_m$ is the motor voltage, $i_m$ is the motor current, $R_m$ is the electrical resistance of the motor circuit (e.g., including the motor 56 and power converter circuitry, not shown), $\omega_m$ is the rotational speed of the motor 56, and $v_B$ is the brush drop voltage. $K_e$ is a motor voltage or torque constant.

In the above equations, the brush drop voltage ($v_B$) is a nonlinear function of the current ($i_m$) and is mathematically expressed as follows:

$$v_B = \sigma(i_m) V_0 \left(1 - e^{\frac{-|i_m|}{I_0}}\right)$$

where $V_0$ and $I_0$ represent the brush drop voltage and current variables, respectively. Thus, the expanded power equation may be written as follows.

$$R_m i_m^2 + K_e \omega_m i_m + v_B(i_m) i_m = -V_{ECU} I_b - R_c I_b^2$$

$$R_m i_m^2 + K_e \omega_m i_m + \sigma(i_m) V_0 \left(1 - e^{\frac{-|i_m|}{I_0}}\right) i_m = -V_{ECU} I_b - R_c I_b^2$$

Thus, given a regenerative current limit ($I_{blim}$), the roots of the aforementioned equation may be determined. If the final motor currents are maintained within the resultant roots, the regenerative current is lower than the specified limit. Hence, the roots of the following function are to be determined to determine the regenerative current limits.

$$f(i_m) = R_m i_m^2 + K_e \omega_m i_m + v_B(i_m) i_m + V_{ECU} I_{blim} + R_c I_{blim}^2 = 0$$

It can be seen that if motor current $i_m$ and motor velocity $\omega_m$ have the same sign, the above equation has no solution. This implies that the regenerative current limiting can be achieved without modifying motor currents in quadrants I and III of the current-speed plane. Thus, the equation only is solved when the region of operation is in quadrants II and IV, that too only in particular predetermined regions.

Figure 5:
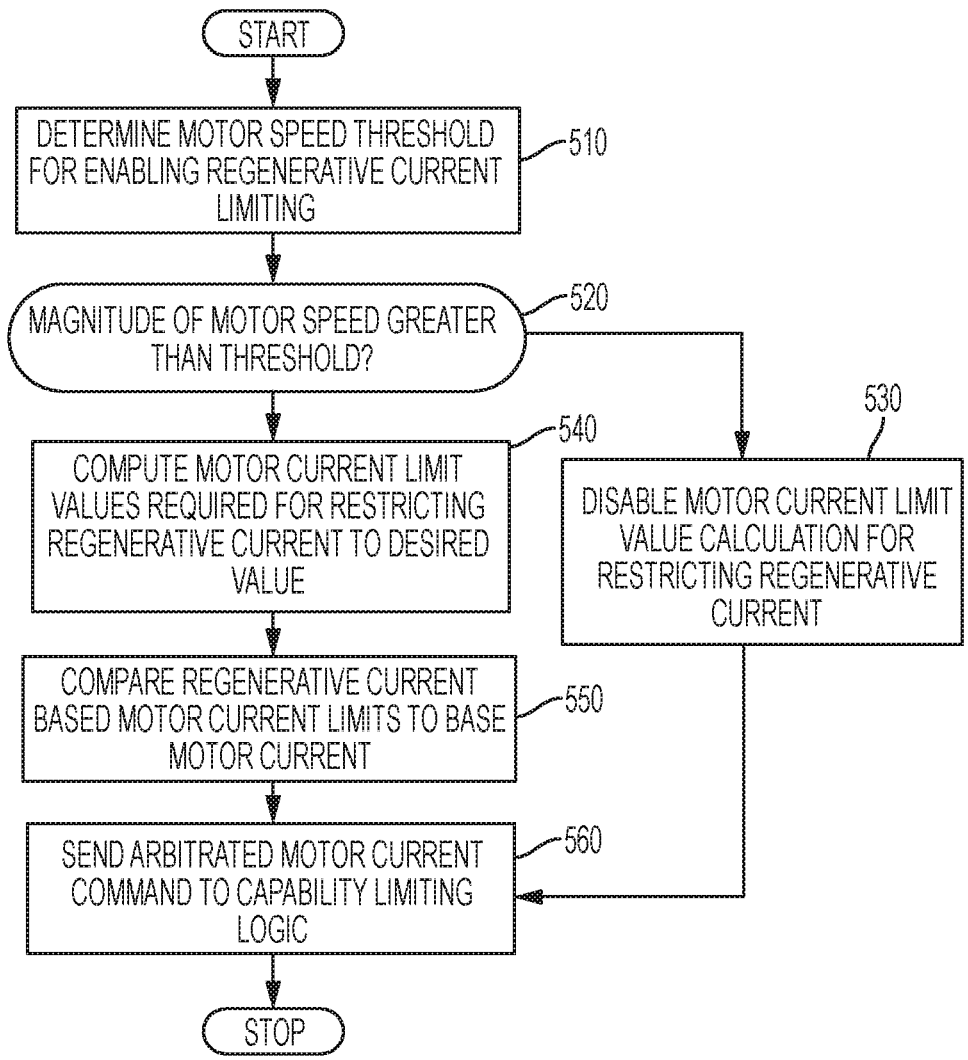
FIG. 5 depicts aspects of a regenerative current limiting method that can be performed by a motor control system.

FIG. 5 illustrates a flowchart of an example method for limiting the regenerative current limit for a motor control system according to one or more embodiments. The method includes determining a motor speed threshold for enabling the regenerative current limiting, as shown at block 510. In one or more examples, the threshold may be a preconfigured value. The method further includes checking if the present motor speed exceeds the motor speed threshold, as shown at block 520. If the present motor speed exceeds the threshold(s), the calculation for regenerative current limit is enabled, as shown at block 530. Alternatively, if the present motor speed is within the threshold values, the calculation for determining regenerative current limit to restrict the regenerative current of the motor control system is not performed, as shown at block 530. Note that the comparison of the speed with the threshold value facilitates reducing the computation burden. Alternatively, or in addition, the regenerative current based motor current limits may be computed, where the region in which no solution exists, the motor current limits may be set to very high value such that no modification of the original motor current command occurs.

The calculated regenerative current limit based motor current limits are compared with the base motor current as shown at block 550. Further, an arbitrated motor current command is sent to the current capability limiting module 64, which generates the current command $i_r$ for the current regulator 54.

It should be noted that in one or more examples, the method includes the computing of the desired motor current limit values irrespective of the motor speed (e.g. by setting values to arbitrate the current command limits to effectively disables the regenerative current limiting results when the motor speed is within the threshold(s)).

Figure 6:
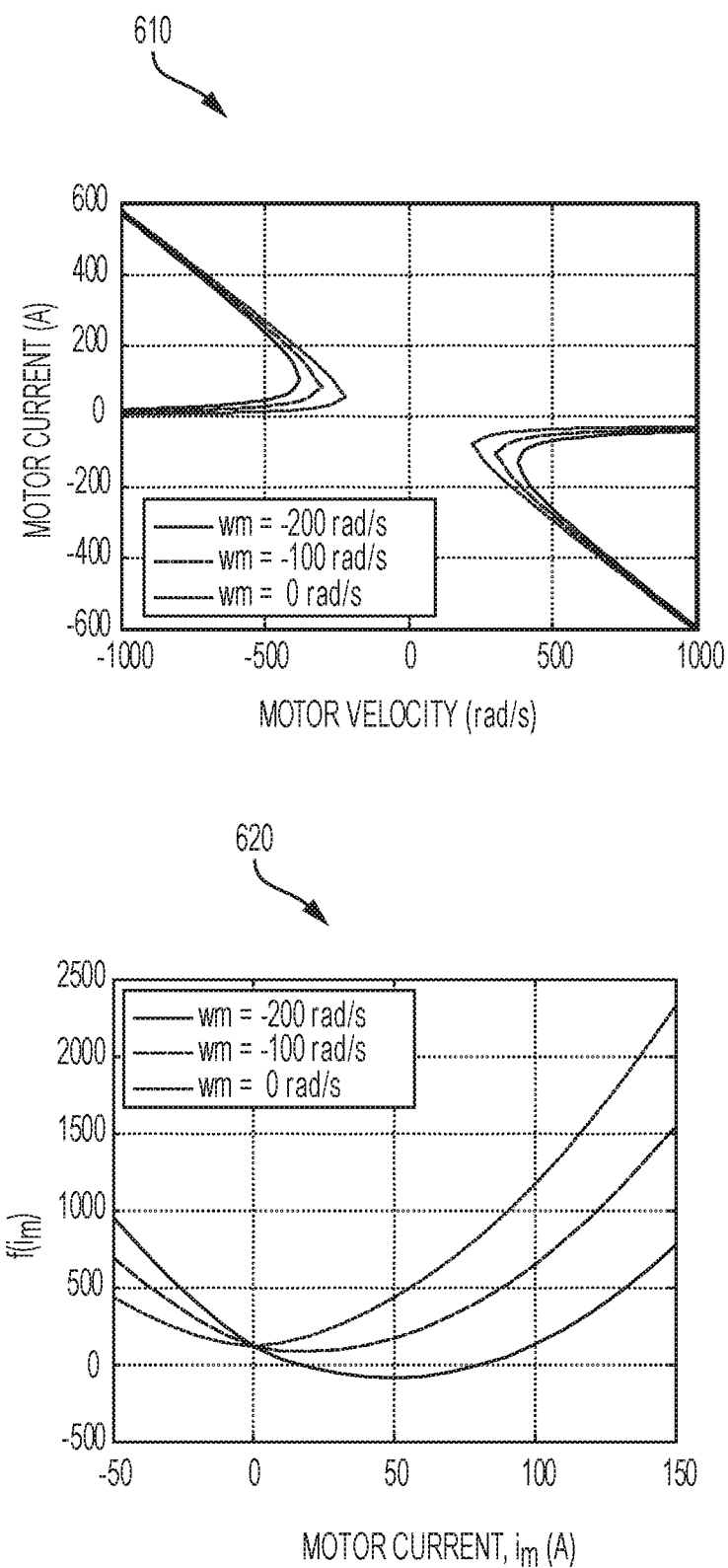
FIG. 6 depicts example graphs of regenerative current limit values according to one or more embodiments.

FIG. 6 depicts example graphs of regenerative current limit based motor current limit values obtained by solving for the final motor current command $f(i_m)=0$ in multiple example scenarios. It should be noted that the graphs depicted are for examples, and that in one or more examples, with varying operating settings and/or parameters of the motor control system, the solutions can be different than those depicted. In FIG. 6, the graph 610 illustrates solution of $f(i_m)=0$ versus $\omega_m$ for multiple regenerative current limit values. The larger curves correspond to smaller values of $I_{blim}$. As depicted in the plots in 610, the solution to $f(i_m)=0$ are to be determined only above a specific motor speed threshold $\omega_{m0}$.

Further, graph 620 depicts plots of $f(i_m)$ versus $i_m$ for a given $I_{blim}$ at multiple motor speeds (quadrant 2 considered only in the illustration). As can be seen $f(i_m)$ is only negative for some values of currents, above the speed threshold. For instance, in the plots in 620, $f(i_m)=0$ has only one valid root at a threshold motor velocity $\omega_{m0}$. Thus, the value of $\omega_{m0}$ is calculated first and compared to the operating speed $\omega_m$ of the motor 56 in order to determine whether any limiting is to be done at all. Alternatively, in one or more examples, the value of $f(i_m, \omega_m)$ may be calculated at the operating speed $\omega_m$ for the entire range of $i_m$ values, and if the result is always positive, then no further calculations, and thus limiting, are performed.

Although the above solutions improve the performance of the motor control system by limiting the regenerative current, the computations to obtain the exact solutions to the above equations can be computationally complex, and in one or more examples, may not be performed in real-time. The technical solutions herein facilitate improving the performance of the motor control system by using approximations to determine the regenerative current limit based motor current limits dynamically.

For example, to determine the regenerative current limit based motor current limits, the motor control system uses the following expression for the brush drop voltage.

$$v_B = gV_0$$

where g is either 0, −1 or −1. Thus, $f(i_m)$ becomes a pseudo-quadratic equation, whose roots are given by the following expression.

$$i_m = -\frac{(K_e\omega_m + v_B)}{2R_m} \pm \sqrt{\left(\frac{K_e\omega_m + v_B}{2R_m}\right)^2 - \frac{V_{ECU}I_{blim} + R_c I_{blim}^2}{R_m}} = -\frac{(K_e\omega_m + v_B)}{2R_m} \pm \sqrt{D}$$

The above equation has valid roots only when $D>0$. However, because D depends on the value of $I_{blim}$ and the motor speed $\omega_m$, $D>0$ may not always be true. The value of speed at which $D=0$ is the threshold speed $\omega_{m0}$ and thus may be obtained by back solving as follows.

$$\omega_{m0} = \frac{-v_B \pm 2\sqrt{R_m(V_{ECU}I_{blim} + R_c I_{blim}^2)}}{K_e}$$

$$D(\omega_{m0}) = 0$$

It has to be ensured that the approximate threshold speed $\omega_{m0}$ is larger in magnitude than the true value (exact solution), because for the same $I_{blim}$ value, the roots exist at higher magnitudes of velocity, but not at lower values (see graph 610). Thus, the value of g is set to +1 and −1 for positive and negative motor speeds respectively. The final threshold motor speed calculations are as follows.

$$\omega_{m0} = \frac{\pm\left(V_0 + 2\sqrt{R_m(V_{ECU}I_{blim} + R_c I_{blim}^2)}\right)}{K_e}$$

Alternatively, in one or more examples, the approximation may be to compute a base motor speed threshold magnitude and then artificially inflating the value to ensure valid roots of $f(i_m)=0$. This may be mathematically expressed as follows.

$$\omega_{m0} = \pm(1+k)\omega_{m0b} = \pm(1+k)\left(\frac{\sqrt{2R_m(V_{ECU}I_{blim} + R_c I_{blim}^2)}}{K_e}\right)$$

where k is a calibratable scalar between 0 and 1 used for inflating the motor speed threshold values.

Next, the value of operating motor speed is compared to the threshold motor speed, and the decision for whether the regenerative current limit based motor current limits is to be calculated is made as mentioned before (FIG. 5). If the motor current limits are to be computed, and because solutions are guaranteed based on the above checks, the motor current limit values are computed by solving the above equations using different techniques. For example, as described if the most accurate solution is desired, an iterative solver such as the bisection method to calculate the four roots of $f(i_m)=0$ at the current operating motor speed. For the bisection method, the end points (motor current values) within which the roots are guaranteed to exist are determined. The two roots in the negative speed (quadrant 2) region will lie between +∞ and 0. The middle point $i_{xn}$ may be selected to be the value of current lying on the straight line that passes through the origin and speed threshold value $-\omega_{m0}$ at the operating speed $\omega_m$. This is expressed mathematically below for computing the $i_{xn}$ value.

$$i_{xn} = \frac{K_e\omega_m + V_0}{2R_m}$$

Thus, the two negative speed roots will lie between $(0, i_{xn}]$ and $[i_{xn}, +\infty)$. Similarly, the two roots in positive speed region will lie between $[i_{xp}, 0)$ and $(-\infty, i_{xp}]$ where $i_{xp}$ is given below.

$$i_{xp} = -\frac{K_e\omega_m + V_0}{2R_m}$$

In one or more examples, the convergence may be achieved faster by selecting smaller end points. For instance, instead of using ±∞, the value of motor currents required for $-I_{blim}$ (or even 0) may be used instead. Further, the values of $i_{xp}/i_{xp}$ may be artificially inflated and reduced appropriately to $i'_{xn}/i'_{xp}$ respectively and used for the end points by using a scale factor h between 0 and 1 as expressed below.

$$i'_{xp} = (1 \pm h) i_{xp}$$

$$i'_{xn} = (1 \pm h) i_{xn}$$

Further, as described earlier, in one or more examples, instead of using a (computationally complex) iterative solver, a quadratic equation could be solved to determine the roots of $f(i_m)$. For instance, for negative speeds, the two roots $i_{rnu}$ and $i_{rnl}$ (upper and lower values respectively) may be obtained as follows.

$$i_{rnu} = -\frac{(K_e \omega_m + a_n V_0)}{2R_m} + \sqrt{\left(\frac{(K_e \omega_m + a_n V_0)}{2R_m}\right)^2 - \frac{V_{ECU} I_{blim} + R_c I_{blim}^2}{R_m}}$$

$$i_{rnl} = -\frac{(K_e \omega_m + a_n V_0)}{2R_m} - \sqrt{\left(\frac{(K_e \omega_m + a_n V_0)}{2R_m}\right)^2 - \frac{V_{ECU} I_{blim} + R_c I_{blim}^2}{R_m}}$$

where $a_n$ may be set to +1 or −1 respectively in the regenerative current limiting. Note that in other examples, $a_n$ may be set to different values to be more/less conservative to facilitate more/less violation of the regenerative current limits being imposed in consideration of OEM's limits.

Similarly, for positive speeds, the two roots $i_{rpu}$ and $i_{rpl}$ (upper and lower values respectively) may be obtained as follows.

$$i_{rpu} = -\frac{(K_e \omega_m + a_p V_0)}{2R_m} + \sqrt{\left(\frac{(K_e \omega_m + a_p V_0)}{2R_m}\right)^2 - \frac{V_{ECU} I_{blim} + R_c I_{blim}^2}{R_m}}$$

$$i_{rpl} = -\frac{(K_e \omega_m + a_p V_0)}{2R_m} - \sqrt{\left(\frac{(K_e \omega_m + a_p V_0)}{2R_m}\right)^2 - \frac{V_{ECU} I_{blim} + R_c I_{blim}^2}{R_m}}$$

where $a_p$ is selected to be −1 and +1 or other predetermined values to be more or less conservative based on OEM limits.

After the regenerative current limit based motor current limit values have been determined, these values are compared against (arbitrated with) other power management requirement limits (such as supply current limits) and finally limited to machine capability, to compute the final motor current command $i_r$, which is then sent to the current regulator 54.

Figure 7:
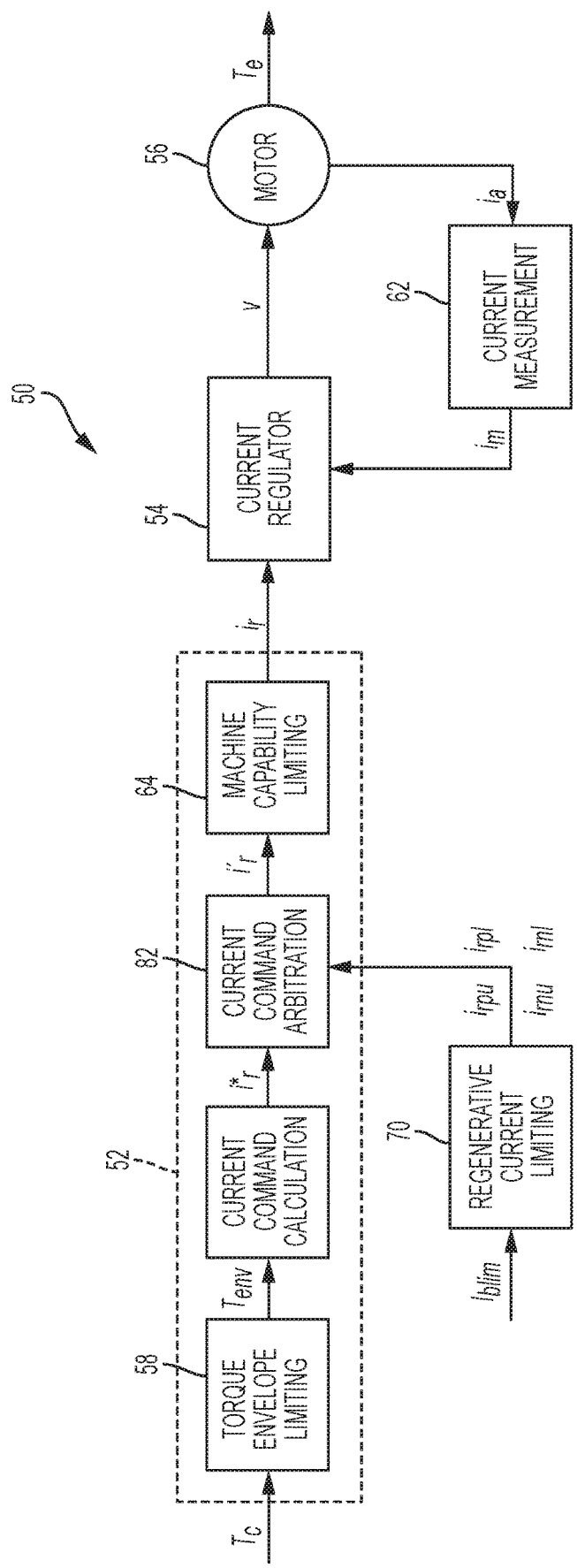
FIG. 7 depicts an example system for limiting regenerative current according to one or more embodiments.

FIG. 7 depicts an example system 50 for limiting regenerative current limit based motor current limits according to one or more embodiments. Apart from the components described earlier (FIG. 2), the illustration depicts a current command arbitration module 82, and a regenerative current limiting module 70. The regenerative current limiting module 70 computes the motor current limits for limiting the regenerative current using one or more techniques described herein. In the motor control method, a regenerative current limiting module 70 receives a regenerative current limit value ($i_{blim}$) and calculates motor current limits $i_{rpu}$, $i_{rpl}$, $i_{rnu}$, and $i_{rnl}$ as described above. The regenerative current limiting module 70 may compute the results using the iterative solver or the approximation techniques described herein. The regenerative current limit based motor current limits are forwarded to the current command arbitration module 82.

The current command arbitration module 82 compares the regenerative current limit based motor current limits received and arbitrates the limits to be set for the current command $i_r*$. The current command arbitration module 82 forwards a limited current command $i_r'$ to the current capability limiting module 64, the $i_r'$ based on the arbitration for the regenerative current limiting.

The current capability limiting module 64 generates the current command ($i_r$) that is used by the current regulator 54 to provide a voltage command to the motor 56. In one or more examples, the motor current limits from the regenerative limiting module 70 and the supply current limiting module 90 are input to the current command arbitration module 82 as pre-limits. The current capability module 64 may further limit the motor current command to a current value calculated (not shown) by the current capability limiting module 64 based on motor capability.

In one or more examples, the regenerative current limiting module 70 implements the aforementioned equations to obtain the motor current limits $i_{rpu}$, $i_{rpl}$, $i_{rnu}$, and $i_{rnl}$ values. In one or more examples, the values are computed in regions where the power-flow equation of the motor control system can be satisfied, for example in the positive and negative quadrants. The computed values are input to the current command arbitration module 82 or other suitable component or module.

In one embodiment, an estimate of the controller input resistance ($R_c$) is used to generate the current limit signal ($i_r'$). An accurate estimate may be obtained by estimating the resistance in the appropriate part of the control system. However, if very accurate supply current limiting is not required, an overestimated high fixed value of $R_c$ may be chosen in order to be conservative.

It is noted that the limits imposed as described herein (such as a regenerative current limit) may be a calibration, a continuously or periodically changing signal or a function of other signals (e.g., voltage). It is also noted that the algorithms and methods described herein may be implemented as a software solution that is executed by a processor, such as the control module 40.

It should be noted that, although the current capability module 64 is shown as using all of the externally provided limits, the motor current limits and the motor capability limit, embodiments described herein are not so limited. The current capability module 64 or other suitable processor can limit or adjust a current command based on one or more of the above-described limits.

Figure 8:
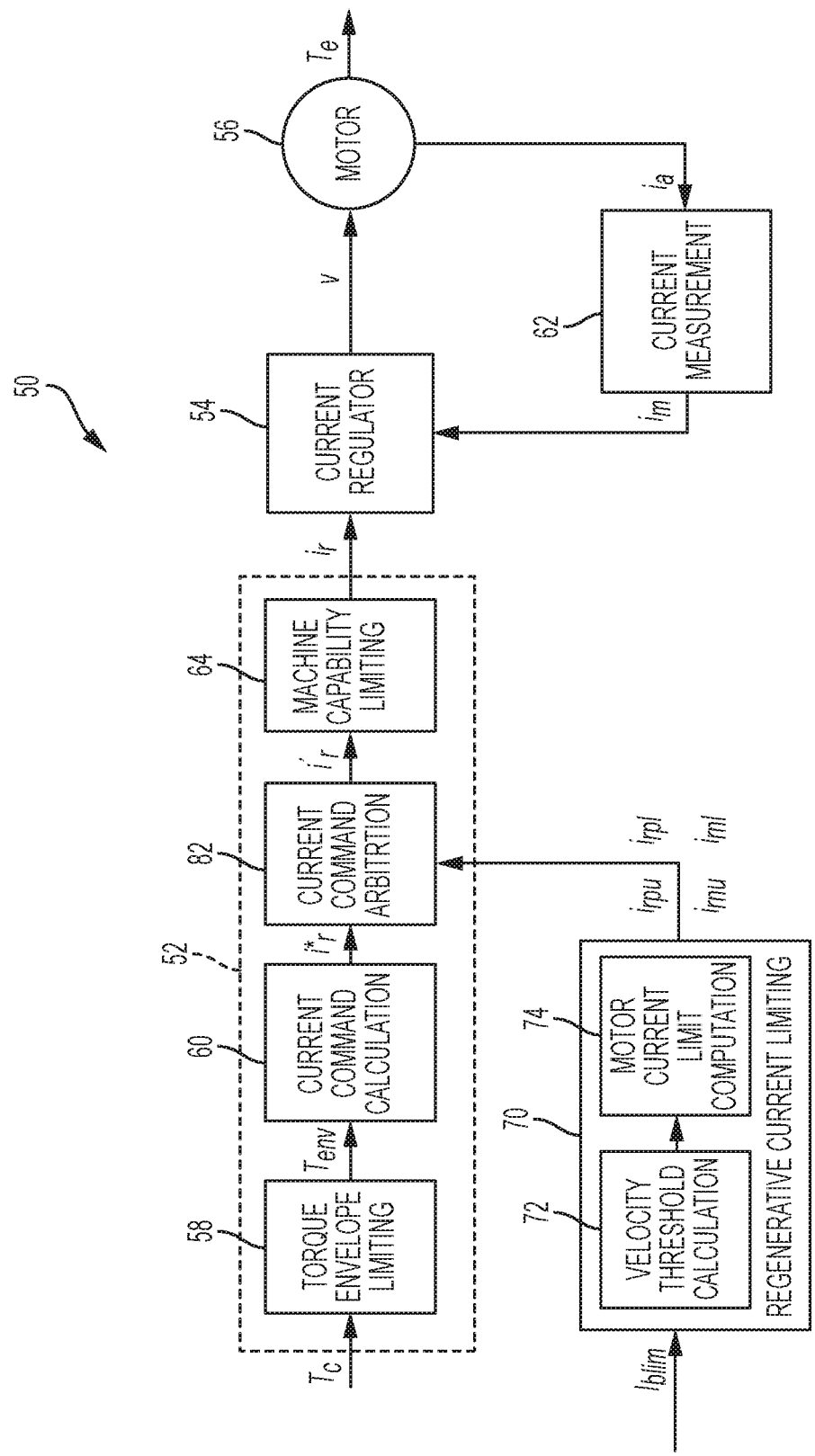
FIG. 8 depicts an example system for limiting regenerative current according to one or more embodiments.

FIG. 8 depicts an example system 50 for limiting regenerative current limit based motor current limits according to one or more embodiments. In one or more examples, the regenerative current limiting module 70 includes a velocity threshold submodule 72 that determines the motor threshold $\omega_{m0}$ values to be used during the computations. Further, the regenerative current limiting module 70 includes a motor current limit computation submodule 74 that computes the $i_{rpu}$, $i_{rpl}$, $i_{rnu}$, and $i_{rnl}$ values as described above. The motor current limit computation submodule 74 may compute the results using the iterative solver or the approximation techniques described herein. The regenerative current limit based motor current limits are forwarded to the current command arbitration module 82. The other components operate in the same manner as described herein (see FIG. 7).

Figure 9:
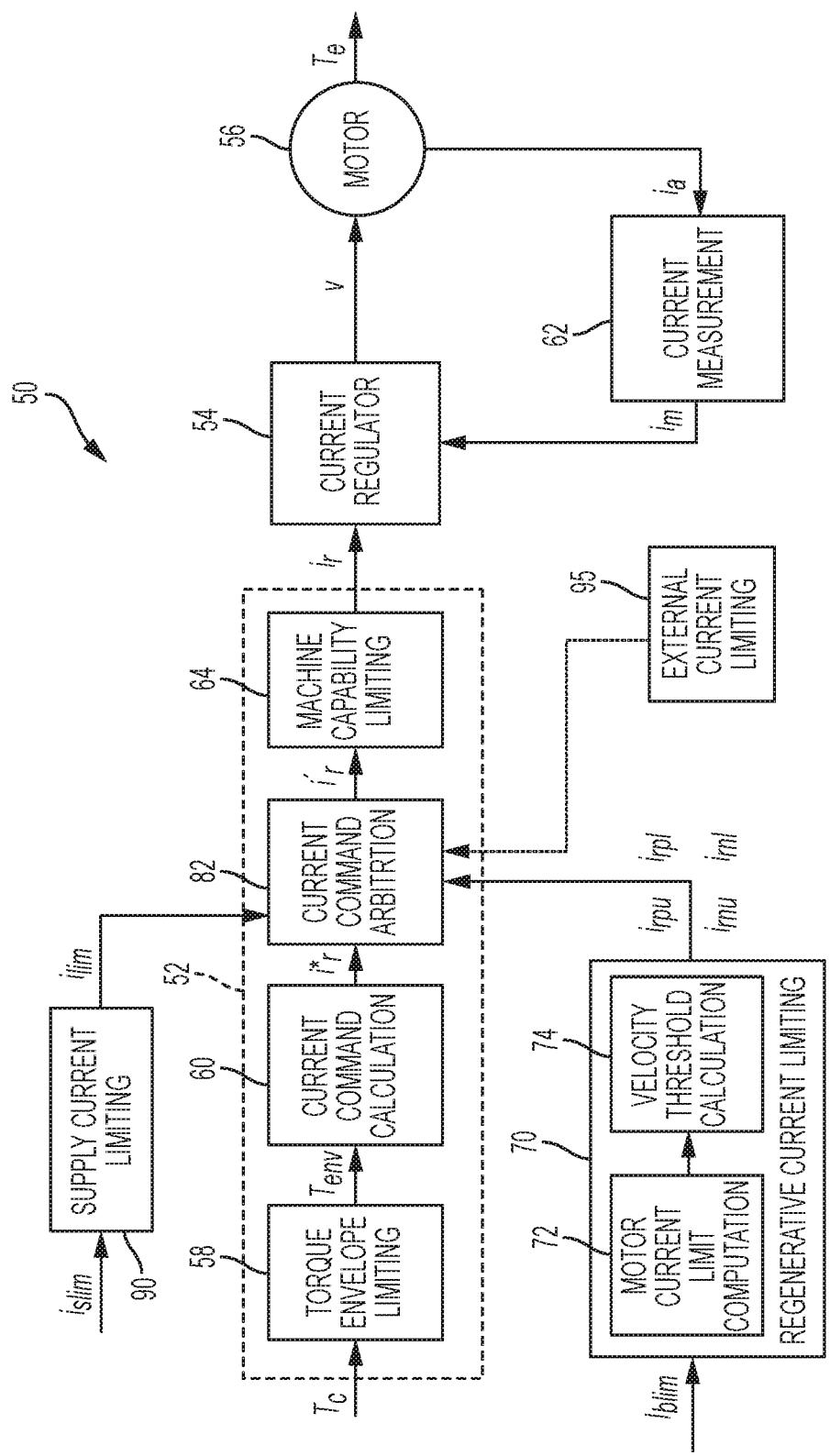
FIG. 9 depicts an example system for limiting regenerative current according to one or more embodiments.

FIG. 9 depicts an example system 50 for limiting regenerative current limit based motor current limits according to one or more embodiments. Apart from the components described earlier (FIG. 7), the illustration depicts a supply current limiting module 90, and an external current limiting module 95. The current command arbitration module 82 receives, apart from the motor current limits $i_{rpu}$, $i_{rpl}$, $i_{rnu}$, and $i_{rnl}$ from the regenerative current limiting module 70, other dynamically computed current command limits. For example, the current command arbitration module 82 receives supply current limits from the supply current limiting module 90. For example, the supply current limits may include limits to be set to protect the power source, such as battery. The current command arbitration module 82 further receives external current limits from the external current limiting module 95.

The current command arbitration module 82 compares the various current command limits received and arbitrates the limits to be set for the current command $i_r^*$. The current command arbitration module 82 forwards a limited current command $i_r'$ to the current capability limiting module 64, the $i_r'$ based on the arbitration for the regenerative current limiting and the supply current limiting, among others. The current capability limiting module 64 generates the current command ($i_r$) that is used by the current regulator 54 to provide a voltage command to the motor 56. In one or more examples, the motor current limits from the regenerative limiting module 70 and the supply current limiting module 90 are input to the current command arbitration module 82 as pre-limits. The current capability module 64 may further limit the motor current command to a current value calculated (not shown) by the current capability limiting module 64 based on motor capability. The other components operate in the same manner as described herein (see FIG. 7).

Embodiments described herein provide a number of benefits and technical effects. Embodiments provide effective techniques for determining limits for regenerative current draw, and imposing the limits for an EPS or other system that utilizes a DC motor, which are important for protecting a battery or other power source.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system comprising:
a current command module configured to receive a torque command and output a current command for controlling a brushed direct current (DC) motor; and
a regenerative current limiting module configured to receive a regenerative current limit as an input and actively compute a motor current limit based on a non-linear function of the regenerative current limit, the regenerative current limit module configured to limit the motor current command to the brushed DC motor based on the motor current limit.

2. The system of claim 1, further comprising a current regulator configured to apply a voltage to the brushed DC motor based on the limited current command.

3. The system of claim 1, wherein the regenerative current limiting module is configured to compute the motor current command based on a voltage loop defined by a motor control system and the brushed DC motor.

4. The system of claim 1, therein the regenerative current limiting module is further configured to determine a motor speed of the brushed DC motor and compute the motor current limit in response to the motor speed not being within a specific range.

5. The system of claim 1, wherein the brushed DC motor is a permanent magnet brushed DC motor.

6. A method of controlling a brushed direct current (DC) motor, the method comprising:
receiving a torque command and outputting a current command for controlling the brushed DC motor;
receiving a regenerative current limit as an input;
active computing, by a regenerative current limiting module, a motor current limit based on a non-linear function of the regenerative current limit; and
limiting the motor current command based on the motor current limit.

7. The method of claim 6, further comprising applying, by a current regulator, a voltage to the brushed DC motor based on the limited current command.

8. The method of claim 6, wherein the motor current command is computed based on power-flow equations of a motor control system.

9. The method of claim 6, wherein the method further comprises determining a motor speed of the DC motor and the motor current limit is computed in response to the motor speed not being within a specific range.

10. The method of claim 7, wherein the brushed DC motor is a permanent magnet brushed DC motor.

* * * * *